(No Model.) 2 Sheets—Sheet 1.
A. J. WISNER.
COUPLER FOR AIR BRAKE MECHANISM ON RAILWAY CARS.
No. 404,760. Patented June 4, 1889.
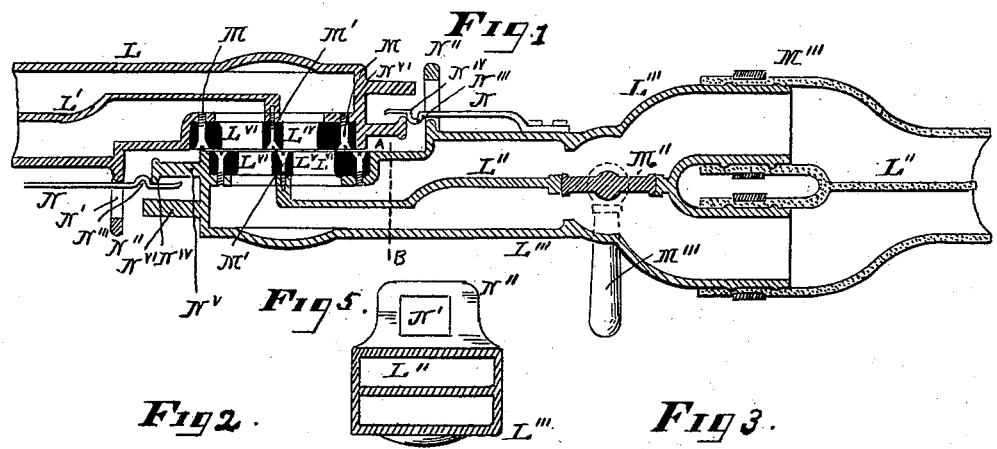
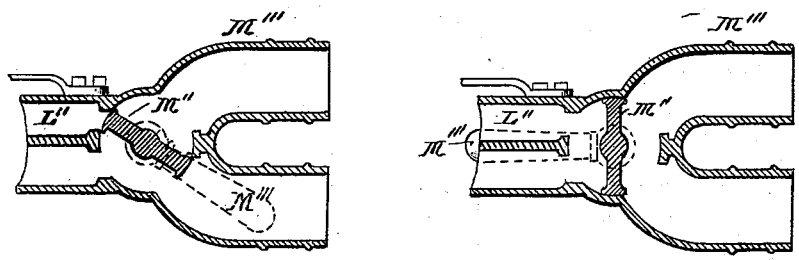
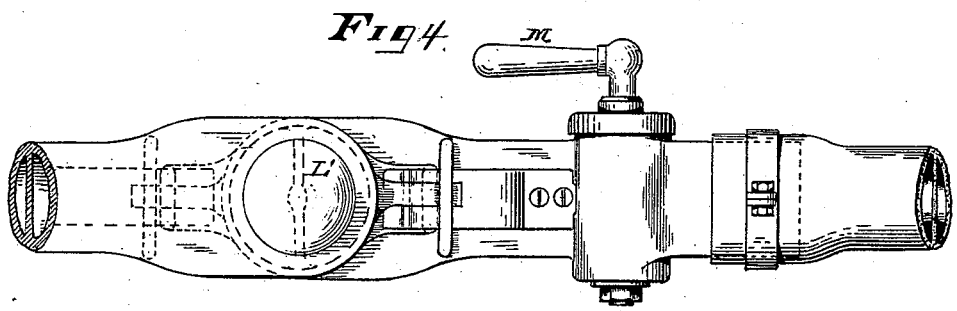
WITNESSES:
INVENTOR
A. Jackson Wisner
per George E. Buckley
atty.

(No Model.) 2 Sheets—Sheet 2.

A. J. WISNER.
COUPLER FOR AIR BRAKE MECHANISM ON RAILWAY CARS.

No. 404,760. Patented June 4, 1889.

WITNESSES:

INVENTOR
A. Jackson Wisner
by George E. Buckley
atty.

United States Patent Office.

ANDREW JACKSON WISNER, OF PHILADELPHIA, PENNSYLVANIA, ASSIGNOR OF ONE-HALF TO MARCUS F. RICHARDSON, OF SAME PLACE.

COUPLER FOR AIR-BRAKE MECHANISM ON RAILWAY-CARS.

SPECIFICATION forming part of Letters Patent No. 404,760, dated June 4, 1889.

Application filed January 12, 1886. Serial No. 188,348. (No model.)

*To all whom it may concern:*

Be it known that I, ANDREW JACKSON WISNER, a citizen of the United States, and a resident of Philadelphia, Pennsylvania, have invented an Improved Coupler for Air-Brake Mechanism on Railroad-Cars, of which the following is a full, clear, and exact description, reference being had to the annexed drawings, making part hereof.

The nature of my invention will fully appear from the following specification and claim.

Figure 6:
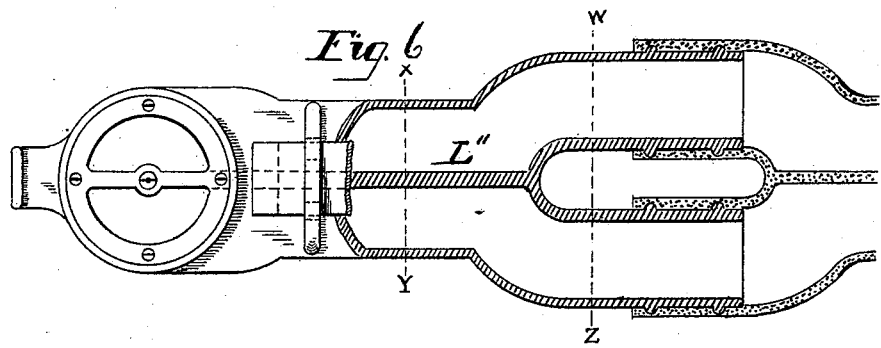
Figure 7:
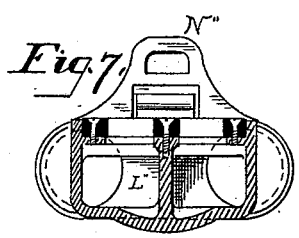
Figure 8:
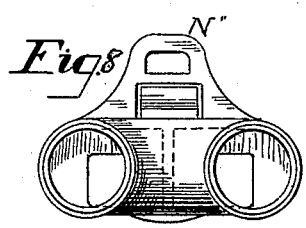
Figure 9:
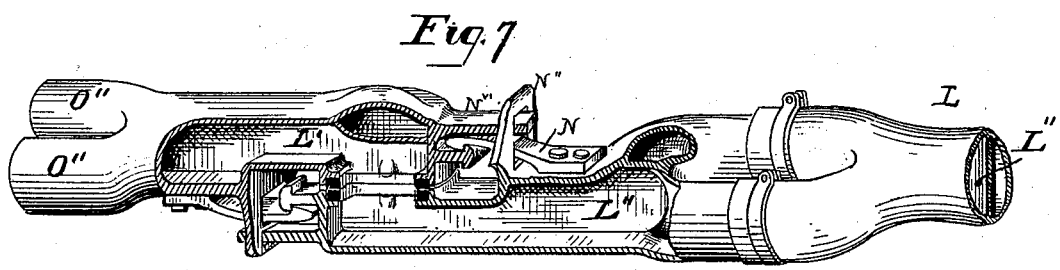

In the drawings, Figure 1 is a longitudinal sectional view of one half of my double-way coupler, the other half being a duplicate of that shown in full. I have shown its end only and the method of joining the two halves. Figs. 2 and 3 are detached views showing the method of guiding the air into different passages and of closing the passages of the couplers. Fig. 4 is an elevation of my double coupler, and Fig. 5 a detached sectional view of my coupler, showing the dividing-wall to create two air-passages through the same, and also showing the brace upon the top to stiffen the joint between the two halves of the coupler. Fig. 6 is a partial longitudinal horizontal sectional view of one form of my coupler and partial plan view; Fig. 7, a vertical cross-sectional view on the line X Y of Fig. 6; Fig. 8, a similar view on the line W Z of Fig. 6; Fig. 9, a perspective view with part of the side broken away, showing an internal vertical division-wall, the joint of the two halves of the coupler and packing in said joint and two branches (one from each division) at the end of one half, the end of the other half being cut off to show the internal wall; and Fig. 10, a plan view showing the method of joining the couplers to the two pipes under the cars.

The object of my improved coupler is to connect the air-conduits between the cars.

L L''' are the outer shells of the two duplicate halves of my coupler.

L' L'' are two dividing-walls, one in each half of the coupler. These walls are longitudinal and horizontal and are so set as to equally divide the interior space, accommodating themselves to the bends or irregularities of the coupler. (See Fig. 1.) At the openings where the two halves L L''' of the coupler meet, the walls L' L'' also meet and coincide in the direction of their lines of division across the openings. The two adjoining edges of the walls L' L'' are provided with lips formed of rubber packing $L^{IV} L^{V}$, whereby when the two halves of the coupler are joined these lips meet and make a closed joint between them impervious to air. $L^{VI} L^{VI}$ are rubber packing-rings used in making the joint of the two halves of my air-brake couplers air-tight. The packing-rings $L^{VI} L^{VI}$ surround the adjoining openings of the two halves and are secured in place by the screws M M, which pierce the rubber and engage in holes in the rims of the two adjoining openings. M' M' are similar screws to secure the rubber packing lips or ribs to the adjoining edges of the division-walls L' L''.

M'' is a combined gate and stop-valve, of which there is one in each half of my coupler. It forms, when fully open, (see Fig. 1,) a part of the wall L'', and is turned by the handle M'''. When turned to the position shown in Fig. 2, it closes one of the air-spaces of the coupler and directs the current of air into one passage. When turned at right angles to the line of the traverse of the air—that is, to the position shown in Fig. 3—it completely blocks or stops up both air-passages. The two air-passages spread at $M^{IV}$ into two separate and distinct pipes for a short distance and unite again beyond, with the dividing-wall L'' in the middle.

N is a band-spring secured to one of the halves L of the coupler and passing through an opening N' in the loop N'', which latter projects from the shell of the coupler. This spring is provided with a lip or corrugation N''', which engages over a lip $N^{IV}$ on a lug $N^{V}$, the latter projecting from the other half of the coupler. (See Fig. 1.) A brace $N^{VI}$ also projects from the last-named other half of the coupler and enters through the opening in the loop N''. As the two halves of the coupler are pushed together the lip N''' engages with the lip $N^{IV}$ and holds the two halves together. The brace $N^{VI}$ projects through loop N'' and stiffens the connection. This spring and the surrounding parts last above described are duplicated on the two halves of the coupler, but upon opposite sides, as shown in Fig. 1.

In Figs. 6 to 10 I show a modification of my improved coupler. Its external construction is the same as that of the one shown in Figs. 1 to 5. The internal construction only differs in that the dividing-wall L' L'' shown in Figs. 6 to 10 is a longitudinal vertical wall, while that shown in Figs. 1 to 5 is a longitudinal horizontal wall, and in the coupler shown in Figs. 6 to 10 I omit to show valve M'' shown in Figs. 1 to 5; but in practice I shall use the latter in the valve shown in Figs. 6 to 10, it being applied in substantially the same manner.

Figure 10:
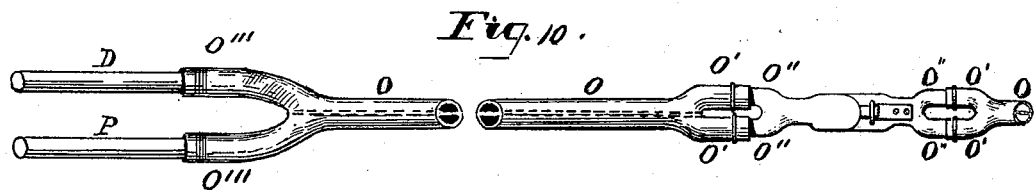

In Fig. 10, O is the rubber hose-connection between the coupler and the two air-pipes under the car. This rubber hose is a single round in the middle with a dividing-wall similar to that of the coupler. It separates at one end into two branches O' O', which fit or engage over two corresponding branches from the coupler, and at the other end this hose terminates in two branches O''' O''', which engage, respectively, with the two pipes under the car and connect the coupler therewith. Each of these branches of the hose opens into one side of the division in the part O of the hose, and each branch of the end at the coupler opens into one side of the division-wall L' or L'' in the latter.

I shall make all my connections between the pipes from car to car by this system of couplers and hose, thus maintaining a double air-passage from one end of the train to the other.

What I claim as new is—

In an air-brake mechanism, the coupler having a single joint, substantially as described, with a longitudinally central dividing-wall L' L'', with packing L$^{IV}$ L$^{VI}$ to maintain the integrity of the division, whereby two separate air-currents can be maintained through a single coupler and the branches O'' O'' from each air-division, whereby these currents may be carried through the intermediary of flexible hose to separate air-pipes beneath the cars, substantially as described.

A. JACKSON WISNER.

Witnesses:
　WM. H. CARSON,
　E. L. CLARK.